(12) United States Patent
Ducellier

(10) Patent No.: US 11,190,293 B1
(45) Date of Patent: Nov. 30, 2021

(54) POLARIZATION MULTIPLEXED FREE SPACE OPTICAL COMMUNICATION SYSTEM

(71) Applicant: COM DEV Ltd., Mississauga (CA)

(72) Inventor: Thomas Ducellier, Ottawa (CA)

(73) Assignee: COM DEV Ltd., Mississauga (CA)

( * ) Notice: Subject to any disclaimer, the term of this patent is extended or adjusted under 35 U.S.C. 154(b) by 0 days.

(21) Appl. No.: 16/929,436

(22) Filed: Jul. 15, 2020

(51) Int. Cl.
*H04J 14/06* (2006.01)
*H04B 10/61* (2013.01)
*H04B 10/532* (2013.01)
*H04J 14/02* (2006.01)

(52) U.S. Cl.
CPC ............ *H04J 14/06* (2013.01); *H04B 10/532* (2013.01); *H04B 10/6162* (2013.01); *H04J 14/0227* (2013.01)

(58) Field of Classification Search
None
See application file for complete search history.

(56) References Cited

U.S. PATENT DOCUMENTS

| | | | | |
|---|---|---|---|---|
| 3,670,166 | A * | 6/1972 | Kaminow | G02F 1/31 398/101 |
| 4,687,281 | A * | 8/1987 | Gross | G03H 1/08 356/4.09 |
| 5,740,288 | A * | 4/1998 | Pan | G02B 6/2773 385/11 |
| 6,249,364 | B1 | 6/2001 | Martin et al. | |
| 7,593,641 | B2 | 9/2009 | Tegge, Jr. | |
| 7,627,251 | B2 | 12/2009 | Walther et al. | |
| 8,417,118 | B2 | 4/2013 | Bai | |
| 8,559,821 | B2 | 10/2013 | Wen et al. | |
| 9,413,132 | B2 | 8/2016 | Levy et al. | |
| 10,404,403 | B2 | 9/2019 | Troeltzsch et al. | |
| 2002/0118359 | A1 * | 8/2002 | Fairley | G01N 21/8806 356/237.2 |

(Continued)

OTHER PUBLICATIONS

Lambda Research Optics, Inc., Glan Thompson Polarizing Beamsplitter Cubes (CGTS), product specs, accessed Jan. 13, 2020 <https://www.lambda.cc/product/glan-thompson-polarizing-beamsplitter-cubes-cgts> (3 pages).

(Continued)

*Primary Examiner* — Darren E Wolf
(74) *Attorney, Agent, or Firm* — Bereskin & Parr LLP/S.E.N.C.R.L., s.r.l.; Isis E. Caulder; Ahmed Elmallah

(57) ABSTRACT

Various embodiments for an optical system are described herein. Generally, the optical system may include an optical transmitter coupled to an optical signal transmission path, an optical receiver coupled to an optical signal reception path, and an external signal path extending between an external optical assembly and both the optical signal transmission path and the optical signal reception path. An optical polarization division multiplexer may be provided to couple the optical signal transmission path and the optical signal reception path to the external signal path. A first non-reciprocal polarization rotator may be also positioned along the external signal path between the optical polarization division multiplexer and the external optical assembly. Further, a quarter wave plate may be positioned along the external signal path between the non-reciprocal polarization rotator and the external optical assembly.

20 Claims, 14 Drawing Sheets

(56) References Cited

U.S. PATENT DOCUMENTS

| | | | | |
|---|---|---|---|---|
| 2004/0081466 A1* | 4/2004 | Walther | ............ | H04B 10/1143 398/152 |
| 2004/0109655 A1* | 6/2004 | Dennis | ............ | H04B 10/2916 385/123 |
| 2009/0219960 A1* | 9/2009 | Uberna | ............ | G02B 27/144 372/27 |
| 2012/0206792 A1* | 8/2012 | Powers | ............ | G02F 1/39 359/330 |
| 2013/0093410 A1* | 4/2013 | Eriksson | ............ | G01R 15/242 324/96 |
| 2016/0041337 A1* | 2/2016 | Docter | ............ | G02B 6/12019 385/11 |
| 2016/0274305 A1 | 9/2016 | Ye et al. | | |
| 2018/0375583 A1 | 12/2018 | Wang et al. | | |

OTHER PUBLICATIONS

Thorlabs, Inc., "Mounted Zero-Order Quarter-Wave Plates", product specs, accessed Jan. 13, 2020 <https://www.thorlabs.com/newgrouppage9.cfm?objectgroup_id=7234> (4 pages).

Thorlabs, Inc., "Faraday Rotators", product specs, accessed Jan. 13, 2020 <https://www.thorlabs.com/newgrouppage9.cfm?objectgroup_id=12684&gclid=CjwKCAjwxaXtBRBbEiwAPqPxcM8F7JNC4fBGBj8u2dSF53x8kfgsAJQ1uAca1JZuqkfznAk8Rxf8eRoCAz4QAvD_BwE> (2 pages).

I&Optics Ltd., "Free Space Faraday Rotator", product specs, 2016 <http://www.iandoptics.com/pic/201606301940291864.pdf> (1 page).

Namiki Precision Singapore Pte. Ltd., optical isolators and Faraday rotator product specs, 2019 <http://www.namikisingapore.com.sg/product/fiber_optic/pdf/isolator.pdf> (4 pages).

"Faraday rotator", Wikipedia, May 27, 2020 <https://en.wikipedia.org/wiki/Faraday_rotator> (2 pages).

"Optical isolator", Wikipedia, Apr. 27, 2020 <https://en.wikipedia.org/wiki/Optical_isolator> (4 pages).

Lawrence et al., "A Polarimetric Line-of-Sight Channel Model for MIMO Satellite Communications", 2013 Australian Communications Theory Workshop (AusCTW), IEEE, Adelaide, SA, Australia, pp. 99-104.

* cited by examiner

Polarization multiplexed Rx/Tx with Rx and Tx protected against Tx backscattering

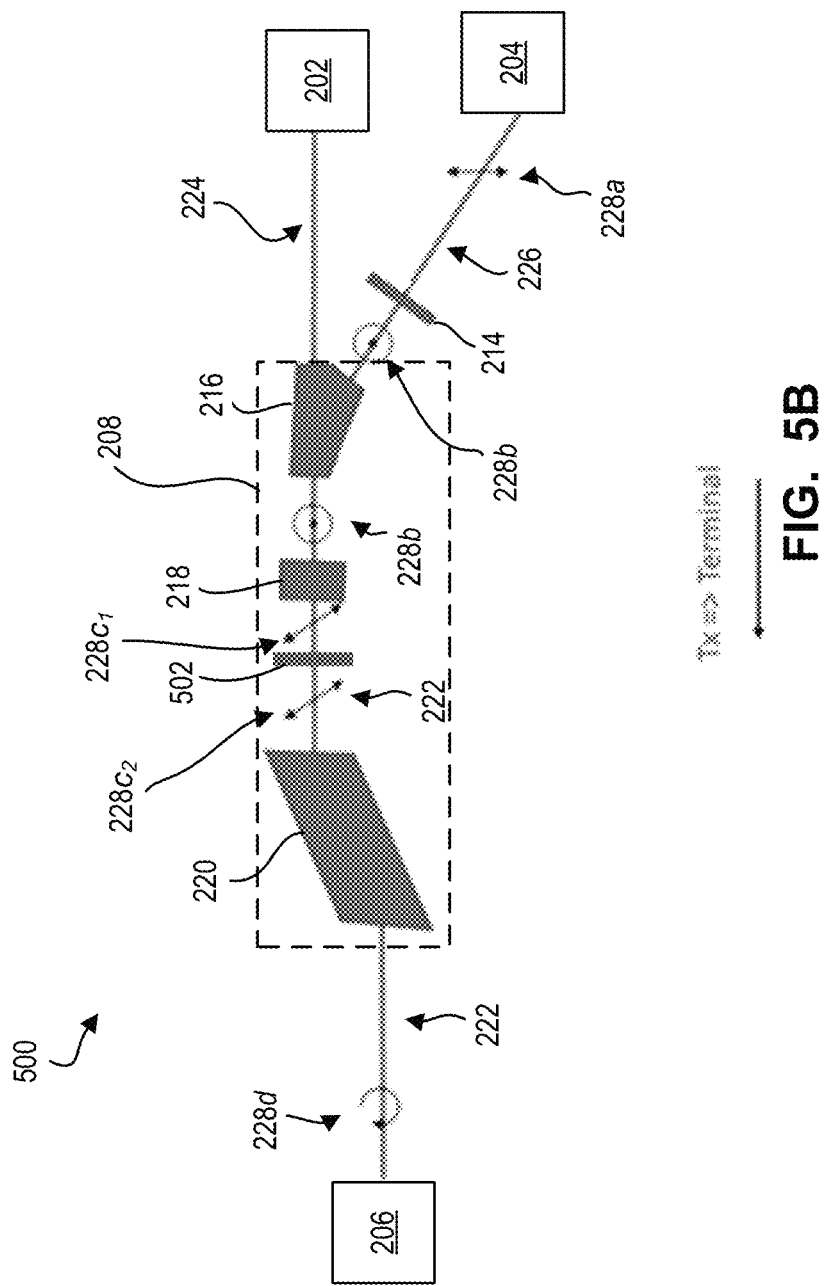

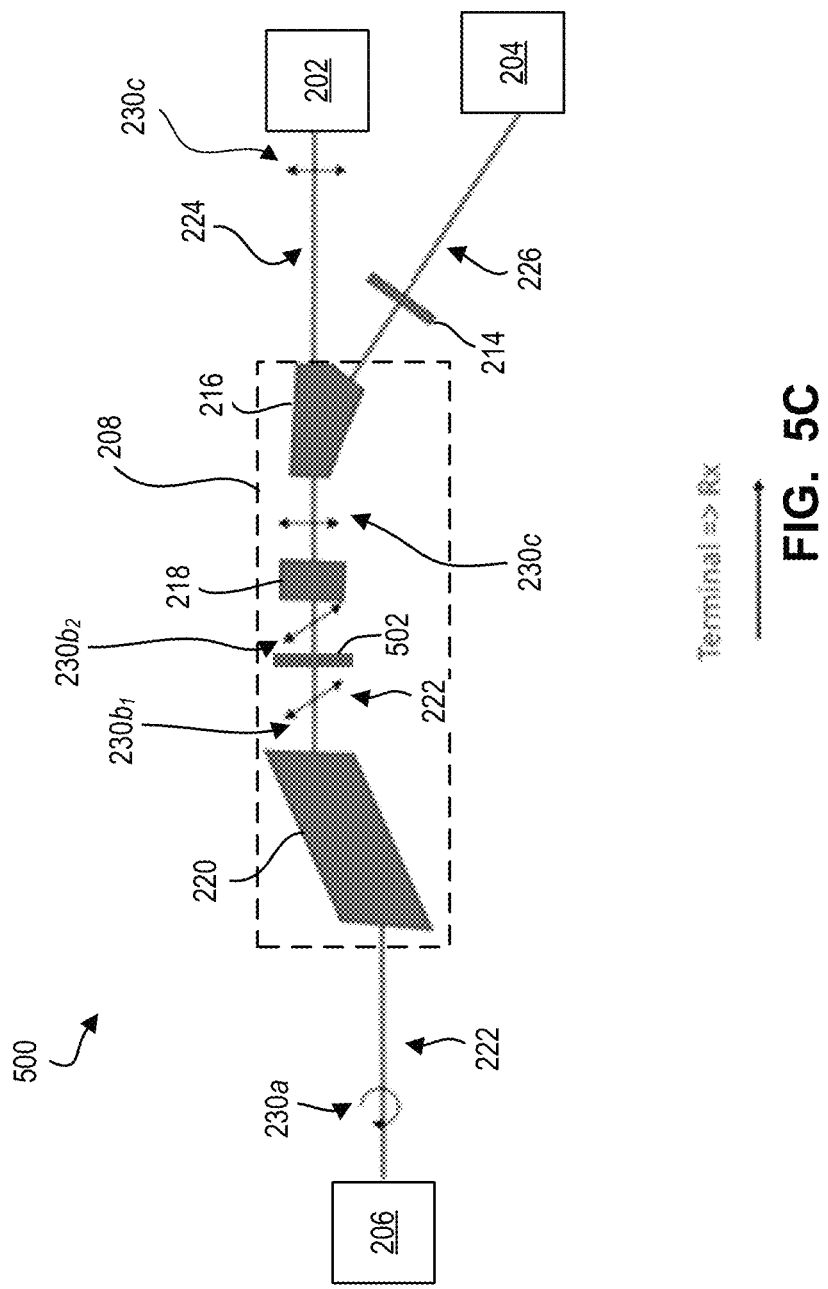

POLARIZATION MULTIPLEXED FREE SPACE OPTICAL COMMUNICATION SYSTEM

FIELD

The present subject-matter relates to optical communication systems, and more particular to a polarization multiplexed free space optical communication system.

INTRODUCTION

The following is not an admission that anything discussed below is part of the prior art or part of the common general knowledge of a person skilled in the art.

Free space optical (FSO) links allow for exchange of data across air mediums and vacuums. FSO links may be deployed, for example, to facilitate exchange of data between satellites, satellites and stationary and/or mobile ground terminals, various ground terminals, various airborne objects (e.g., aircrafts) as well as between satellites and either airborne objects or ground terminals.

Generally, optical communication terminals deployed in FSO communication links include at least an optical transmission subsystem, and an optical reception subsystem. Optical transmission subsystems encode data into an optical signal, and transmit the encoded optical data to an external destination (e.g., a satellite, airborne object or ground terminal). Transmission subsystems may include, for example, a laser source to encode and transmit the data information. Optical reception subsystems receive optical signals transmitted from external sources, and can decode the optical signals to extract encoded data. In various cases, the reception subsystem may include photodetectors and/or coherent receivers. In some cases, optical communication terminals may also include additional components to further facilitate transmission and/or reception of optical signals. For example, communication terminals may include an optical train (e.g., optical assembly) of elements for guiding and magnifying/de-magnifying transmitted and/or received beams (also known as the "telescope"). Coarse and fine pointing assemblies can also be included for enhanced and precise re-direction of transmitted and/or received signals.

Owing to vastly dissimilar optical power levels of transmitted versus received signals of many optical communication terminals, challenges often emerge in designing terminals to reduce crosstalk between transmitting and receiving channels. Challenges also emerge in respect of preventing backscattered transmitted optical signals from blinding the receiver. In particular, backscattering may result when a transmitted optical signal is retro-reflected from mirrors and/or other back-scattering elements along the transmission path, or otherwise from dirt or dust accumulated on transmission path mirrors. In various cases, signals which backscatter onto the receiver may blind the receiver, and may otherwise obscure the receiver's ability to receive an external optical signal. In FSO links, this problem is compounded owing to the difference in energy level between the backscattered transmitted signal and the received signal. In particular, due to the extreme signal loss experienced in many FSO link, the received signal may have an energy level that is multiple orders lower (e.g., 5 to 8 orders of magnitude) than the energy level of the backscattered signal. This, in turn, may cause the backscattered signal to drown-out the received signal.

In view of the foregoing, there is a desire for an optical communication system providing enhanced isolation between transmitting and receiving channels, while minimizing the deleterious effects of backscattered transmitted signals on a system receiver.

SUMMARY

The following introduction is provided to introduce the reader to the more detailed discussion to follow. The introduction is not intended to limit or define any claimed or as yet unclaimed invention. One or more inventions may reside in any combination or subcombination of the elements or process steps disclosed in any part of this document including its claims and figures.

According to one aspect of the invention, there is disclosed an optical system comprising: an optical transmitter coupled to an optical signal transmission path; an optical receiver coupled to an optical signal reception path; and an external signal path extending between an external optical assembly and both the optical signal transmission path and the optical signal reception path; an optical polarization division multiplexer coupling the optical signal transmission path and the optical signal reception path to the external signal path, wherein the optical polarization division multiplexer is configured to couple optical signals having a first polarization between the external signal path and the optical signal transmission path and the optical polarization division multiplexer is configured to couple optical signals having a second polarization between the external signal path and the optical signal reception path, wherein the second polarization is orthogonal to the first polarization; a first non-reciprocal polarization rotator positioned along the external signal path between the optical polarization division multiplexer and the external optical assembly; and a quarter wave plate positioned along the external signal path between the non-reciprocal polarization rotator and the external optical assembly, wherein the optical transmitter is configured to emit a transmitted light signal having the first polarization in an outward direction along the external signal path towards the external optical assembly via the optical signal transmission path and the optical polarization division multiplexer; the optical receiver is configured to receive a received light signal having the second polarization having travelled from the external optical assembly along the external signal path in an inward direction towards the optical receiver via the optical signal transmission path and the optical polarization division multiplexer; the outward direction is opposite to the inward direction; and the first non-reciprocal polarization rotator and the quarter wave plate are arranged to convert any optical signal travelling in the outward direction with the first polarization to a first circular polarization having a first handedness and to convert any optical signal travelling in the inward direction along the external signal path with a second circular polarization back to the first linear polarization, wherein the second circular polarization has a second handedness orthogonal to the first handedness.

In some embodiments, the first non-reciprocal polarization rotator is a Faraday rotator.

In some embodiments, the optical polarization division multiplexer comprises a polarizing prism.

In some embodiments, the polarizing prism is a Glan-Thompson prism.

In some embodiments, the optical system further comprises a half-wave plate positioned along the optical signal transmission path between the optical transmitter and the optical polarization division multiplexer.

In some embodiments, the half-wave plate is configured to convert between the first polarization and the second polarization.

In some embodiments, the first polarization is a transverse magnetic (TM) polarization, and the second polarization is a transverse electric (TE) polarization.

In some embodiments, the optical system further comprises an optical isolator positioned along the optical signal transmission path between the optical transmitter and the optical polarization division multiplexer, the optical isolator comprising a second non-reciprocal polarization rotator, a reciprocal polarization rotator and a linear polarizer.

In some embodiments, the second non-reciprocal polarization rotator is a Faraday rotator.

In some embodiments, the reciprocal polarization rotator effects a 45° rotation to a signal polarization.

In some embodiments, the linear polarizer has a transverse electric (TE) polarization alignment.

In some embodiments, the quarter-wave plate comprises a Fresnel Rhomb.

In some embodiments, a linear polarizer is positioned along the external signal path between the quarter wave plate and the first non-reciprocal polarization rotator.

In some embodiments, the linear polarizer is configured to adjust a polarization state of an incident optical signal to compensate for imperfect polarization rotation resulting from at least one of wavelength and temperature dependence for at least one of the quarter wave plate and the first non-reciprocal polarization rotator.

In some embodiments, the linear polarizer has a +45° rotation alignment.

In some embodiments, the linear polarizer is a Glan-Thompson prism, and a prism face of the Glan-Thompson prism comprises a light dump.

In some embodiments, the optical system is adapted for use with dense wavelength division multiplexing (DWDM) schemes as to provide the optical system with forward and backward compatibility with other optical systems.

In some embodiments, the optical system comprises a compact assembly formed by arranging optical elements with abutting complementary faces.

In some embodiments, the first circular polarization is a left-hand circular polarization, and the second circular polarization is a right-hand circular polarization.

In some embodiments, the quarter wave plate is at least one of mounted to a rotary stage, and switched electrically using liquid crystal, to allow the system to switch between communicating with other optical terminals communicating using circular polarization signals having different handedness.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

FIG. 5B is the example optical communication system of FIG. 5A, and showing transmission of an optical signal;

FIG. 5C is the example optical communication system of FIG. 5A, and showing reception of an optical signal;

DESCRIPTION OF VARIOUS EMBODIMENTS

Figure 1:
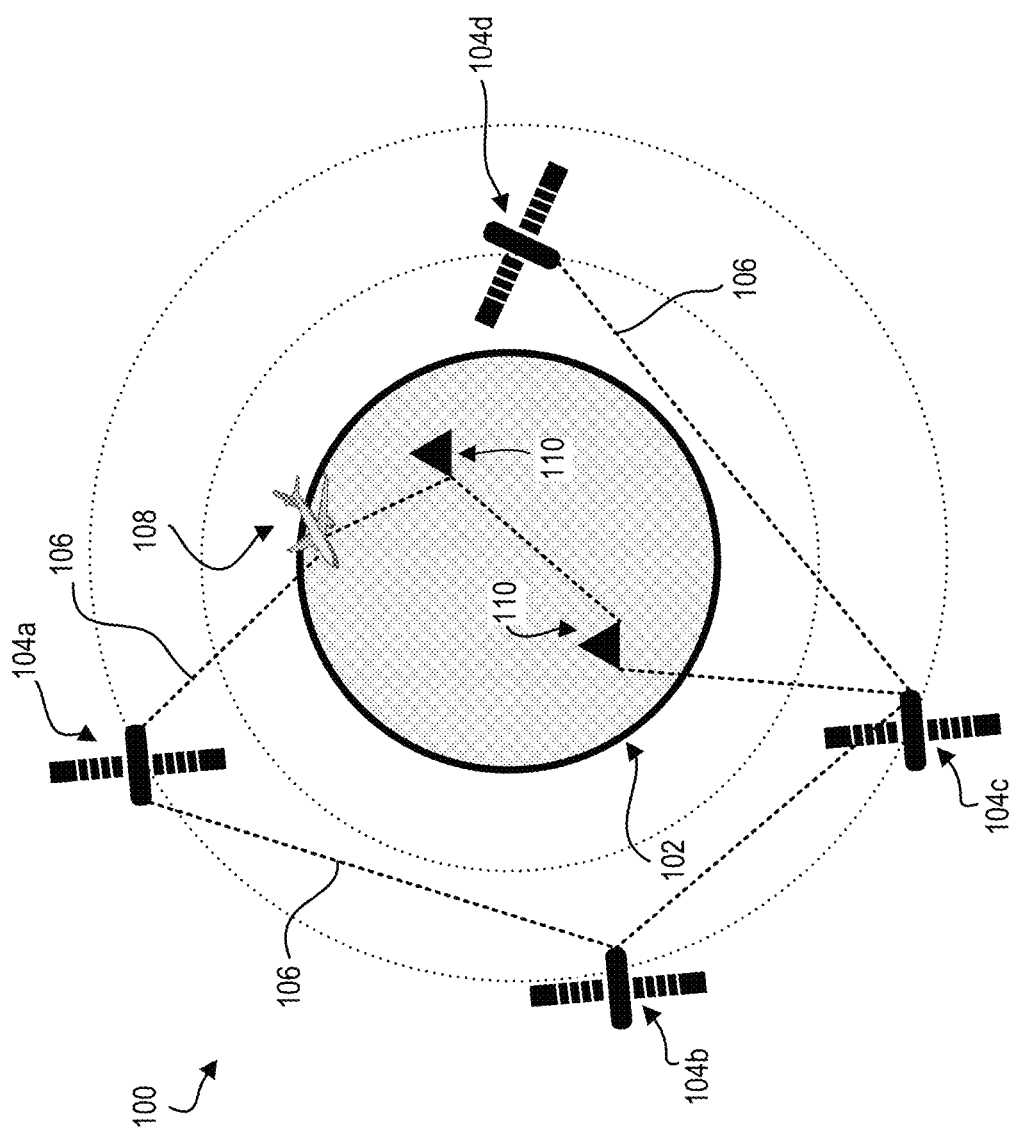
FIG. 1 is an example environment for a free space optical communication system.

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

In the description and drawings herein, reference may be made to a Cartesian co-ordinate system in which the vertical direction, or z-axis, extends in an up and down orientation from bottom to top. The x-axis extends in a first horizontal or width dimension perpendicular to the z-axis, and the y-axis extends cross-wise horizontally relative to the x-axis in a second horizontal or length dimension.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. As used herein, two or more parts are said to be "rigidly coupled", "rigidly connected", "rigidly attached", or "rigidly fastened" where the parts are coupled so as to move as one while maintaining a constant orientation relative to each other. None of the terms "coupled", "connected", "attached", and "fastened" distinguish the manner in which two or more parts are joined together.

As discussed in the background, a challenge in designing optical communication systems for use in FSO communication links is providing for sufficient isolation between transmitting and receiving channels, as well as reducing the deleterious effect of backscattered transmitted signals on the receiver subsystem.

Conventional optical communication systems effect isolation between the transmitting and receiving channels by using one of a number of methods, including wavelength separation, physical separation, modal separation and/or polarization separation.

Wavelength separation methods use separate wavelength bands for the receiver and transmitter channels, with isolation being effected by inserting appropriate wavelength filters (e.g., dichroic mirrors).

While wavelength separation offers a simple isolation design, wavelength separation methods also limit the spectrum of available wavelengths over which optical signals may be transmitted and/or received. In particular, systems using wavelength separation methods deploy wavelength sensitive receivers and/or transmitters which may be otherwise incompatible with wavelength multiplexing schemes—e.g., dense wavelength division multiplexing (DWDM). In various cases, this may limit opportunities to configure existing optical communication terminals to transmit and/or receive at new wavelength bands (e.g., higher wavelength bands) to accommodate new communication terminal deployments (e.g., satellites) in a growing communication network. Still further, the use of wavelength separation techniques often introduces a layer of design complexity in order to enable the communication terminal to communicate with other terminals operating at different wavelength bands (e.g., higher versus low wavelength bands).

In contrast to wavelength separation, polarization separation techniques offer an alternative in which signals may be transmitted and/or received in the same wavelength band, but are otherwise separated by orthogonal polarization states (e.g., circular right-handed or circular left-handed polarization). Optical elements (e.g., polarizing beam splitters) are inserted in the optical path to isolate the transmitting and receiving channels based on the signal's polarization.

As systems deploying polarization separation do not rely on wavelength sensitive elements, these systems offer a convenient solution to scaling problems inherent in systems employing wavelength separation techniques. Polarization separation methods also require simpler construction to facilitate switching between terminals transmitting and/or receiving using different polarization states. However, in the context of inter-satellite communication—often characterized by extreme link budgets (e.g., excess of 50 dB or 70 dB of optical losses)—the requirement to reject non-targeted transmitted or received polarizations may be exceedingly demanding (e.g., seven orders of magnitude). Systems deploying polarization separation methods also often fail to prevent backscattering of transmitted optical signals from blinding the receiver.

Other method for isolating the transmitting and receiving channels include physical separation and modal separation.

Physical separation methods deploy separate optical telescopes for the transmitting and receiving channels. The use of separate telescopes, however, increases manufacturing costs, typically doubling the cost of using a single telescope. In some cases, a single telescope may also be used, assuming sufficient angular separation is provided between the transmitting and receiving channels. The use of a single telescope, however, may only have practical application in cases where communication occurs between objects having fast relative cross-speeds (e.g., a satellite and ground facility, or two satellites on different orbital planes/directions), such that a Point-Ahead-Angle is larger than the angular spread of each beam. Accordingly, this restricts transmission to cases when the relative cross-velocity between the terminals is always greater than a pre-determined threshold, which may not always be achievable.

Modal separations allows transmission and reception along the same wavelength, but encodes transmitting and receiving signals using different spatial or angular orbital momentum modes of light. Modal separations methods also often require complex and costly multiplexing and de-multiplexing elements to separate transmitting and receiving signals having different modes.

Accordingly—and in view of deficiencies inherent in conventional optical communication systems—there is a desire for an enhanced optical communication system which can achieve high isolation between receiving and transmitting channels, all the while preventing backscattered transmitted signals from blinding the receiver. Further, and in contrast to current systems, there is also a desire for a non-wavelength dependent communication system. In particular, a non-wavelength dependent communication system may accommodate a growing network of optical communication terminals which may operate at different wavelength bands. Still further, there is a desire for an optical communication system using a multiplexing and de-multiplexing technique—i.e., to isolate between transmitting and receiving signals—which accommodates the often extreme link budget characteristic of some types of FSO links (e.g., inter-satellite communication links). Preferably, the optical communication system may have a simple and cost-effective construction that may be easily deployed in size limited areas.

In view of the foregoing—and in accordance with embodiment provided herein—there is provided an optical communication system having a novel arrangement of optical elements providing high isolation between the transmitter and receiver. The novel arrangement includes various reciprocal and non-reciprocal polarizing elements which together function as an effective multiplexer and de-multiplexer (MUX-DEMUX) for separating transmitted and received signals.

In accordance with further embodiments provided herein, the optical elements are also arranged to prevent backscattered transmitted signals from blinding the receiver subsystem. In contrast to conventional systems, the system re-directs backscattered transmitted signals back to the transmitter, rather than directing away from the transmitter. In particular, it has been appreciated that in the context of FSO links—generally characterized by high link loss—redirecting retro-reflected signals back to the transmitter protects the more sensitive receiver (e.g., receiving weak signals), all the while incurring minimal penalty on the source transmitter.

Further, as provided herein, the disclosed optical communication system is not reliant on conventional wavelength separation methods to isolate between the transmitting and receiving channels. Accordingly, the system overcomes a number of drawbacks inherent in systems employing these methods. For example, the system may be configured for wavelength multiplexing techniques (e.g., DWDM), thereby allowing for flexible forward scaling of the communication system to accommodate a growing communication network. In other words, the communication system may be reconfigured to transmit and/or receive at higher (or lower) wavelength bands to accommodate newer (or older) communication terminals in a growing communication network. This, in turn, provides the system with backward and forward compatibility. Similarly, the system does not necessarily require switching elements in order to communicate with other terminals transmitting and/or receiving at different wavelength bands.

Referring now to FIG. 1, which shows an example environment 100 for an optical communication system, in accordance with embodiments provided herein.

As stated previously, optical communication systems deployed for FSO communication allow data to be exchanged across air mediums and/or vacuums. For example, optical communication terminals may be installed on satellites 104 orbiting a ground (e.g., earth) 102 reference, and may allow transmission and/or reception of optical signals 106 across vacuum (e.g., space) as between multiple satellites. The communication terminals installed on satellites 104 may also allow the satellites 104 to communicate across a vacuum and/or air medium with airborne objects 108 (e.g., an aircraft), or ground-based terminals 110 (e.g., mobile or stationary). FSO links may also be established between different ground-based terminals 110, as well as between ground-based terminals 110 and airborne objects 108.

In various cases, it may be necessary to scale the communication network by deploying new satellites 104, ground terminals 110 and/or accommodating new airborne objects 108. In these cases, it is important for optical communication systems, deployed in each communication terminal, to exhibit backward compatibility with existing terminals, as well as forward compatibility with newly deployed terminals. In particular, the newly deployed terminals may be transmitting and/or receiving signals within different wavelength bands and/or otherwise using different modulation schemes.

Referring now to FIGS. 2A-2E, which illustrate an example optical communication system 200 (otherwise referred to herein as an optical communication assembly 200), in accordance with some embodiments. The optical communication system 200 can be installed, for example, in an optical communication terminal associated with a satellite, airborne object, or ground terminal (e.g., mobile or stationary)

As shown, optical system 200 generally includes an optical receiver 202, an optical transmitter 204 and an external optical assembly 206.

Receiver 202 is a subsystem for receiving optical signals from external sources, as well as decoding the received signals to extract encoded data information. In some cases, receiver 202 may include, for example, a photodetector and/or a coherent receiver module. Transmitter 204 may be a laser source for encoding data information into an optical beam to be transmitted to an external destination. External assembly 206 may include a telescope, or an optical train (e.g., optical assembly) which directs transmitted and/or received signals into or out of the communication terminal, as well as magnifies/de-magnifies signals. In some cases, the external assembly 206 may also include coarse and/or fine pointing assemblies for enhanced or precise re-direction of transmitted and/or received signals.

Interposed between the receiver 202, transmitter 204, and the external assembly 206 is an optical multiplexing and de-multiplexing (MUX-DEMUX) assembly 208. The assembly 208 provides high isolation between the receiver 202 and transmitter 204, and prevents backscattering of transmitted signals into the receiver 202. As shown, assembly 208 generally includes an optical polarization division multiplexer 216, a non-reciprocal polarization rotator 218 and a quarter wave plate 220.

Polarization division multiplexer 216 may be, for example, a Glan-Thompson prism having at least three side faces 216a-216c. First face 216a may be coupled to an external optical signal path 222, extending between the prism 216 and the external assembly 206. Second face 216b may be coupled to an optical signal reception path 224, extending between the prism 216 and the optical receiver 202. Third face 216c may be coupled to an optical signal transmission path 226, extending between the optical transmitter 204 and the prism 216. In each case, faces 216 are oriented generally perpendicularly to an axis defining a respective signal path 222, 224 and 226. In some embodiments, the prism 216 may be an achromatic and generally aberration free prism.

In various embodiments, the optical polarization division multiplexer 216 may function to route signals—received from the external signal path 222—along either the signal reception path 224 or signal transmission path 226, based on the polarization state of the signal. For instance, the polarization division multiplexer 216 may route different signals having orthogonal polarization states to either the reception or transmission paths 224, 226. For instance, in the illustrated example embodiment, the polarization division multiplexer 216 may route signals having a transverse magnetic (TM) polarization along the transmission path 226, while routing signals having a transverse electric (TE) polarization along the reception path 224. As provided in further detail herein, the polarization division multiplexer 216 may route signals along the transmission path 226 in cases where the signal comprises a retro-reflected or backscattered transmitted signal. In some cases, the polarization division multiplexer 216 may provide an isolation between the transmission and reception paths of at least 57 dB.

In the illustrated example, the polarization division multiplexer 216 is configured such that the reception path 224 is arranged collinear with the external path 222, while the transmission path 226 is offset by a 135° angle from the external path 222. In this configuration, the polarization division multiplexer 216 diverts (or internally deflects) TM mode signals at generally a 135° angle to the transmission path 226, while directly passing through TE mode signals to the reception path 224. In other cases, the transmission and/or reception paths may be offset by any other suitable angle from the external path 222.

In other embodiments, the configuration of the polarization division multiplexer 216 can be reversed such that TM polarized signals are deflected to the reception path 224, while TE polarized signals are diverted to the transmission path 226. Additionally, or in the alternative, the polarization division multiplexer 216 and assembly 208 may configured such that the transmission path 226 is collinear with the external path 222, while the reception path 224 may be offset by any suitable angle.

Non-reciprocal polarization rotator 218 may be interposed along the external signal path 222, between the external assembly 206 and the polarization division multiplexer 216. The non-reciprocal rotator 218 includes a first rotator face 218a directed toward the polarization division multiplexer 216, and a second rotator face 218b directed toward the external assembly 206. In the illustrated embodiment, the non-reciprocal rotator 218 is a Faraday rotator configured to apply a ±45° rotation to an incident optical signal, based on the propagation direction of the signal through the rotator (i.e., the direction of rotation is defined with reference to the propagation direction of light). For example, the Faraday rotator may apply a +45° rotation to signals propagating in a direction from the first face 218a to the second face 218b, and a −45° rotation to signals propagating in a direction from the second face 218b toward the first face 218a.

In particular, as a non-reciprocal rotator, the rotator does not reverse the rotation of an incident signal when the signal is retro-reflected back through the rotator. In other words, the rotator does not return the signal to its initial polarization rotation state upon retro-reflection. Rather, in the case of a Faraday rotator, the rotator applies a further 45° rotation for each reflected pass-through of the signal (e.g., the rotation direction is defined with reference to the propagation direction). As explained in further detail herein, this property of non-reciprocal rotators—in combination with the operation of the polarization division multiplexer 216—minimizes transmitted backscattered signals from retro-reflecting into the receiver 202.

Quarter wave plate 220 is also positioned along the external signal path 222, and interposed between the non-reciprocal rotator 218 and the external assembly 206. The quarter-wave plate is configured to transform an incident circularly polarized signal (e.g., right or left handed polarization) into a linearly polarized signal, rotated by a ±45° angle. In particular, an incident right-hand circularly polarized signal may be transformed into a linearly polarized signal rotated by a −45° angle, while a left-hand circularly polarized beam may be transformed into a linearly polarized signal rotated by +45° angle. Similarly, the quarter wave plate 220 may convert incident linearly polarized light, rotated by a ±45° angle into a left-hand or right-hand circularly polarized beam, respectively. As shown, the quarter wave plate 220 may have a first face 220a directed toward the prism 216, and a second face 220b directed toward the external assembly 206.

In some embodiments, the quarter wave plate 220 may be either mounted on a rotary stage, or otherwise switched electrically using liquid crystal in order to allow the system to switch between communicating with other optical terminals communicating using right-handed or left-handed circular polarization signals.

In some cases, as shown, the optical transmission path 226 may include a half-wave plate 214 which is used for transforming TM polarized signals into TE polarized signals, and vice-versa. In other embodiments, where the polarization division multiplexer 216 passes TM polarized signals toward the receiver 202 and receives TE polarized signal from the transmitter 204, the half-wave plate 214 may be provided along the optical reception path 224.

In various embodiments, each of the quarter-wave plate 220 and the half-wave plate 214 can be any one of 0th order quartz wave plates, achromatic or super-achromatic wave plates, or may be realized using Fresnel rhomb prisms characterized by broad wavelength range.

Figure 2A:
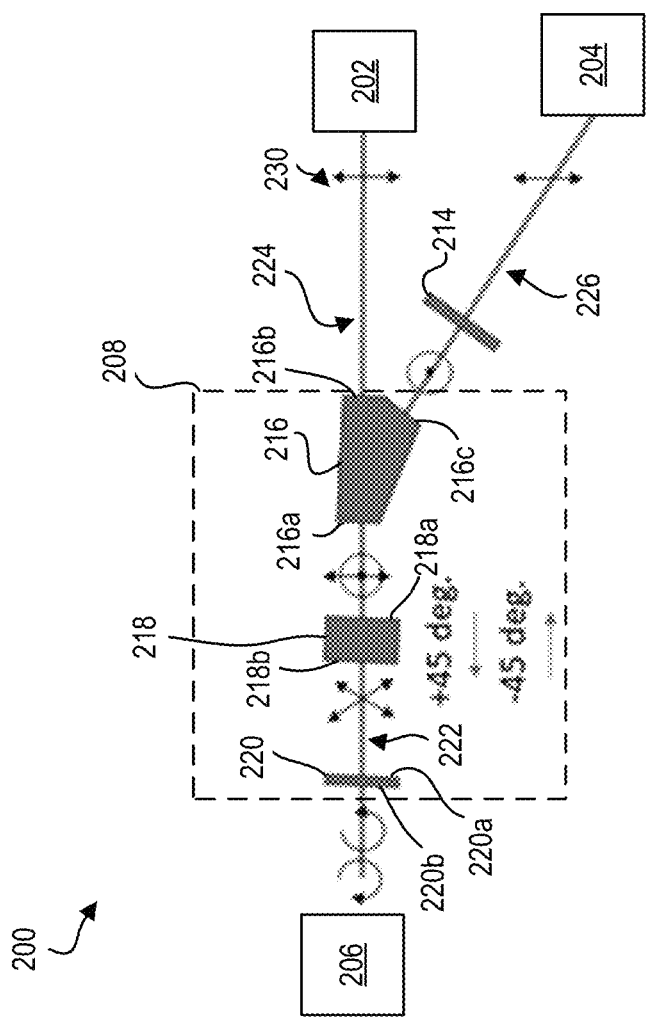
FIG. 2A is an example optical communication system, in accordance with some embodiments.
Figure 2B:
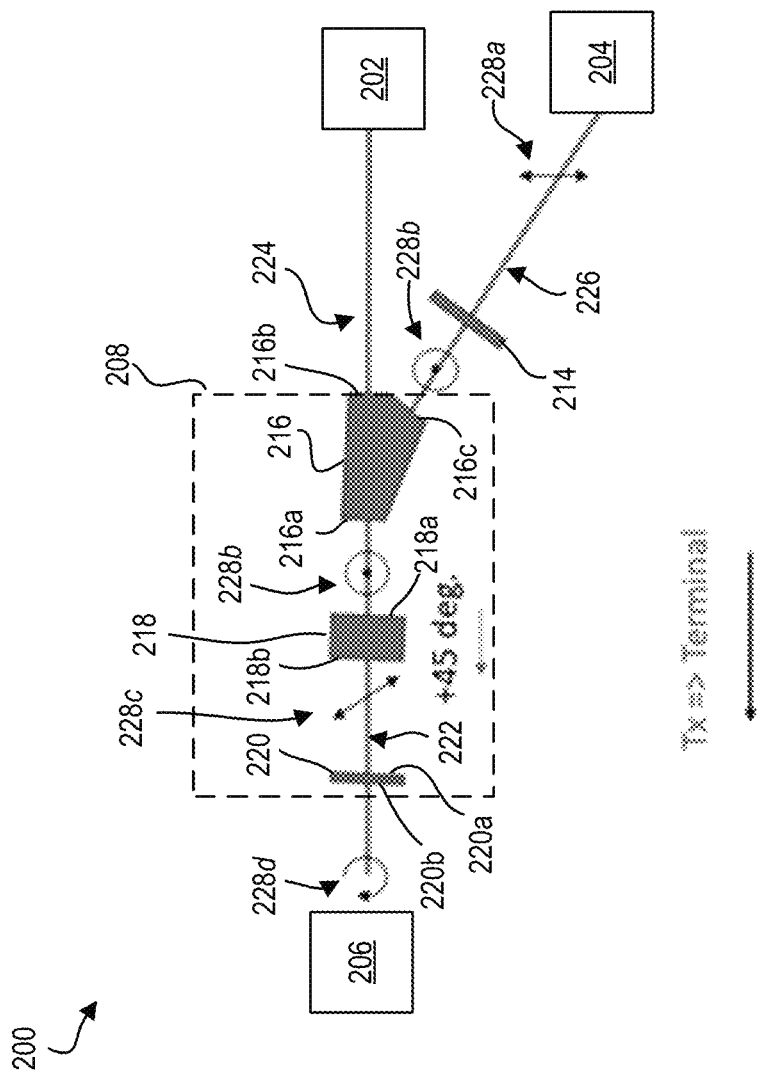
FIG. 2B is the example optical communication system of FIG. 2A, and showing transmission of an optical signal.
Figure 2C:
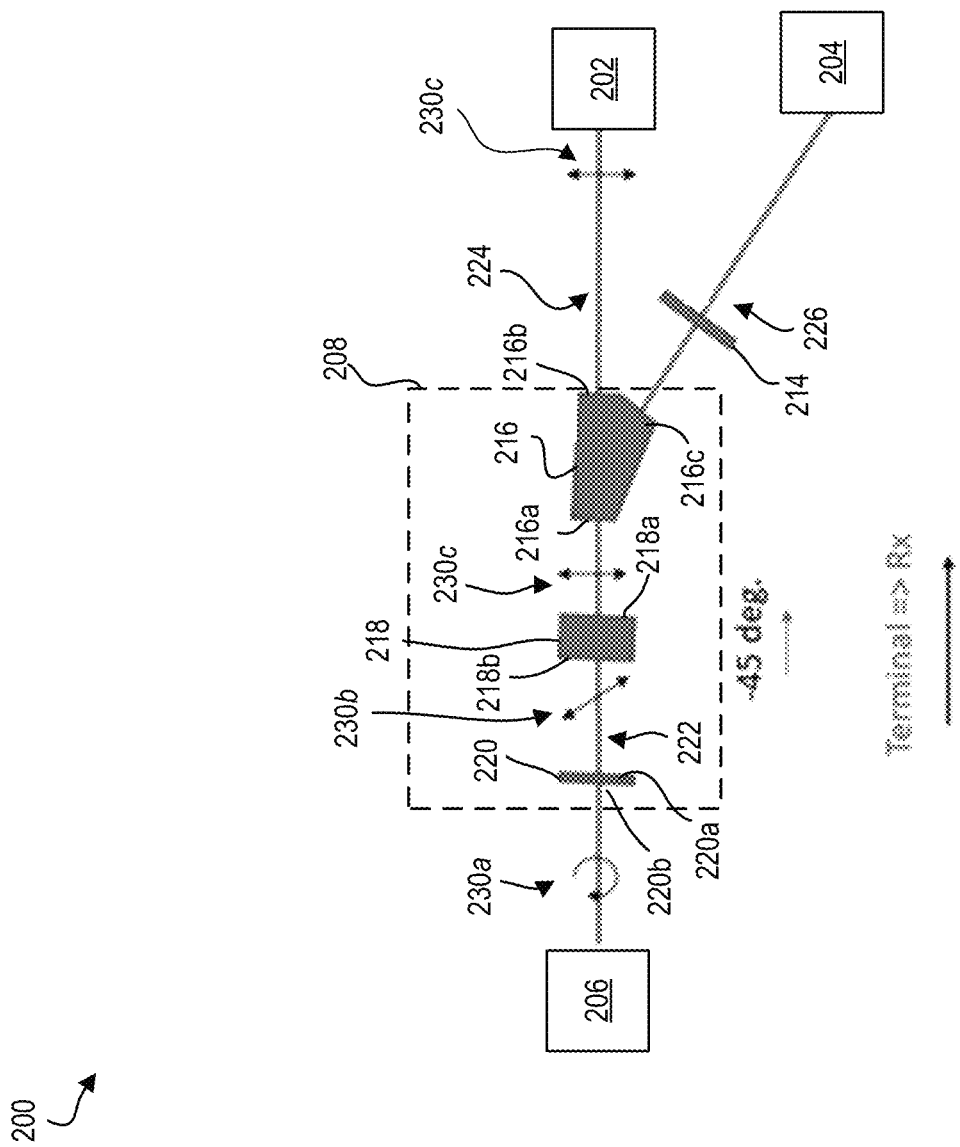
FIG. 2C is the example optical communication system of FIG. 2A, and showing reception of an optical signal.
Figure 2D:
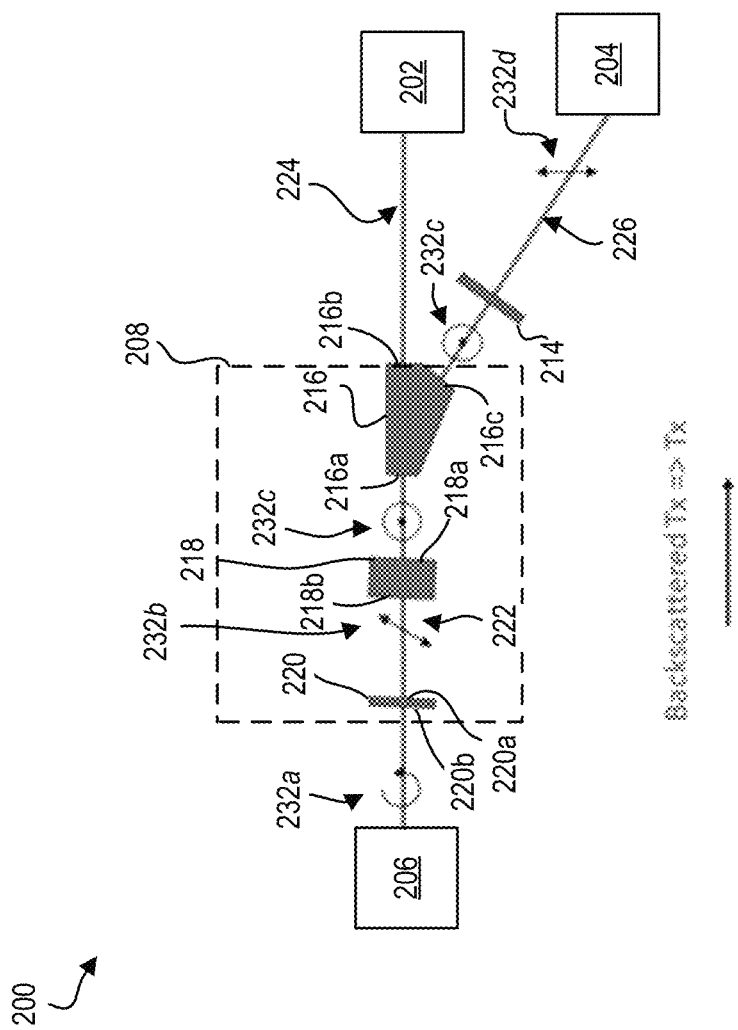
FIG. 2D is the example optical communication system of FIG. 2A, and showing backscattering of a transmitted optical signal.

The operation of the optical system 200 is now described in greater detail herein with reference to FIGS. 2B-2D. Referring first to FIG. 2B, which illustrates the operation of the optical system 200 where an optical signal is transmitted by the transmitter 204.

As shown, the optical transmitter 204 may transmit an optical signal 228a which encodes data for transmission to an external destination. In the illustrated example, the transmitted signal 228a is transmitted having a TE polarization state.

Optical signal 228a travels along the optical transmission path 226, and passes through the half-wave plate 214 which transforms the polarization of the signal 228a to a TM polarized signal 228b. For illustrative purposes, the TM polarized signal is shown with a surrounding circle. In other embodiments, the transmitter 204 may transmit using a TM mode polarization, and the half-wave plate 214 may not be necessary along the optical transmission path 226.

Transformed signal 228b continues through the optical polarization division multiplexer 216, incident on the face 216c. The polarization division multiplexer 216 receives the transformed signal 228b, and routes (e.g., internally deflects) the signal 228b from the transmission path 226 to the external signal path 222. In the illustrated embodiment, the polarization division multiplexer 216 may be a Glan-Thompson prism which deflects the signal 228b by an approximately 135° angle to the external path 222.

The routed signal 228b continues along the external path 222, and passes through each of the non-reciprocal polarization rotator 218 and the quarter wave plate 220, before arriving at the external assembly 206.

Non-reciprocal rotator 218—which is a Faraday rotator in the illustrated example embodiment—effects a +45° polarization rotation to the incident signal 228b to generate a linearly polarized rotated signal 228c, rotated by a +45° angle. The rotated signal 228c passes through quarter wave plate 220, which transforms the linearly rotated signal 228c into a left-hand circularly polarized signal 228d. The left-hand circularly polarized signal 228d continues to the external assembly 206, which directs the signal 228d to an appropriate external destination.

Referring now to FIG. 2C, which illustrates the operation of the optical system 200 when an external optical signal is received, e.g., via the external optical assembly 206.

As shown, the received optical signal 230a is encoded in the same circular polarization state as the transmitted signals 228d (e.g., left-hand circular polarization). The received signal 230a travels along the external signal path 222 and passes through each of the quarter wave plate 220 and the non-reciprocal rotator 218. The quarter wave plate 220 transforms the received left-handed circularly polarized signal 230a into a linearly-polarized signal 230b, rotated by a +45° angle. The rotated signal 230b then passes through the non-reciprocal rotator 218—i.e., the Faraday rotator—which effects a −45° polarization rotation to generate a TE polarized signal 230c. The polarization division multiplexer 216 receives the TE mode signal 230c, and passes the signal 230c directly to the signal reception path 224, and toward the receiver 202.

It will now be appreciated that the transmitted and received signals 228d, 230a are encoded in a common polarization state (e.g., left-hand circularly polarized). Further, the combination of the non-reciprocal polarization rotator 218—which rotates signals based on the direction of propagation—in combination with the polarization division multiplexer 216 which routes different polarization signals through different paths—provides the isolation between the transmitted and received channels.

While the illustrated embodiment provides for a left-hand circularly polarized signal for the transmitted and received signals, it will be understood that the system may also transmit and receive using a right-hand circularly polarized signal. It will also be appreciated that use of circularly polarized signals is to allow for communication between different optical terminals irrespective of each terminal's relative orientation. In other embodiments, the communication system 200 may transmit and receive using linearly polarized signals 228c, 230b by simply removing quarter wave plate 220 from the optical assembly.

As the system 200 does not rely on wavelength separations methods, or wavelength sensitive elements, to isolate between transmitting and receiving channels, system 200 overcomes a number of deficiencies inherent in prior systems which rely on wavelength separation. For example, system 200 is not limited to operating only within specific wavelength bands. In particular, this allows system 200 to be compatible with various wavelength multiplexing schemes—i.e., dense wavelength division multiplexing (DWDM)—which, in turn, allows the system to transmit and/or receive at new wavelength bands. In other words, system 200 may be configurable to accommodate a growing communication network in which new terminals are added to the network and/or operating at different wavelength channels. The design implementation of the system 200 is also simpler and more cost-efficient, as compared to system using physical or modal separation methods.

Referring now to FIG. 2D, which illustrates operation of the optical system 200 where at least a fraction of the transmitted signal is backscattered. Backscattering may occur, for example, when at least a portion of the transmitted signal is retro-reflected inside the external assembly 206.

As shown, the retro-reflection of the transmitted signal reverses the signal's circular polarization state. In the illustrated example embodiment, the retro-reflection of the transmitted signal 228d generates a backscattered signal 232a having a right-hand circular polarization, rather than a left-hand circular polarization.

The backscattered signal 232a travels along the external signal path 222 and passes through each of the quarter wave plate 220, and the non-reciprocal rotator 218. The quarter wave plate 220 transforms the right-hand circularly polarized signal 232a into a linearly polarized signal 232b, rotated by a −45° angle. The non-reciprocal polarization rotator 218 (e.g., the Faraday rotator), in turn, receives the rotated linearly polarized signal 232b, and rotates the signal by a further −45° to generate a TM polarized signal 232c. The TM polarized signal 232c passes through the polarization division multiplexer 216 (e.g., the Glan-Thompson prism), and is deflected to the transmission signal path 226. Half-wave plate 214 transforms the TM polarized signal 232c into a TE polarized signal 232d, which is forwarded to the transmitter 204.

In view of the foregoing, the backscattered signal 232a is routed away from the receiver 202, and re-directed back toward the transmitter 204. As the backscattered signal is generally weak, and the transmitter 204 generally transmits a strong optical signal, the performance penalty on the transmitter 204 is generally limited.

It will be appreciated that the ability of the system 200 to re-direct backscattered signals onto the transmitter is again a result of the combination of both the non-reciprocal polarization rotator 218 (e.g., the Faraday rotator) and the polarization division multiplexer 216. In particular, the backscattered signals 232a—encoded with a reversed circular polarization (e.g., a right-hand circular polarization)—is transformed into a linear polarized signal 232b, rotated by −45° angle, which is orthogonal to the transmitted and received signals 228c, 230b. As the linear polarized signal 232b propagates through non-reciprocal polarization rotator 218, the propagation direction-dependent property of the non-reciprocal polarization rotator 218 allows the polarization rotator 218 to rotate signal into a TM polarization, rather than a TE polarization, which can be routed by the polarization division multiplexer 216 to the transmitter 204 rather than the receiver 202. The system 200 ensures that the backscattered signal and the received signal co-exist in separate and orthogonal polarization states along the external path to prevent mixture of signals. In some embodiments, the system 200 may provide more than 55 dB isolation between the back-reflected transmitted signal and received signals.

Figure 2E:
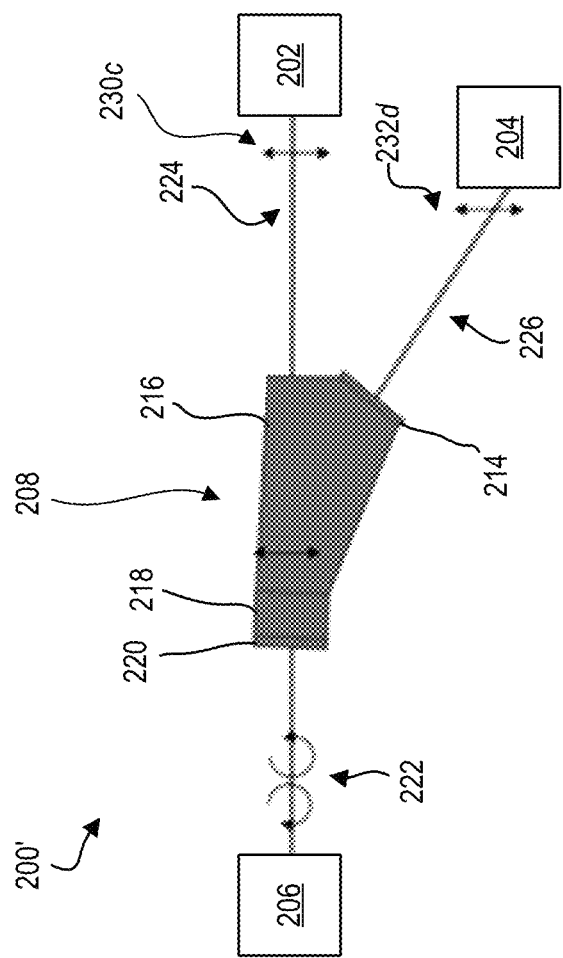
FIG. 2E is a compact embodiment of the example optical communication system of FIG. 2A.

Referring now to FIG. 2E, which illustrates a miniaturized and/or compact embodiment 200' of the optical assembly 200.

As shown, in the compacted embodiment 200', the optical elements of the MUX-DEMUX assembly 208 are arranged with abutting complementary faces. The compacted embodiment 200' may reduce accumulation of dust on surfaces of the various components in an all-glass design. This, in turn, minimizes the potential for back-reflection of transmitted signals reflecting from accumulated dust. The embodiment also provides for a more rugged assembly able to maintain relative alignment of its parts in the presence of vibration, shock and/or temperature variations.

Figure 3:
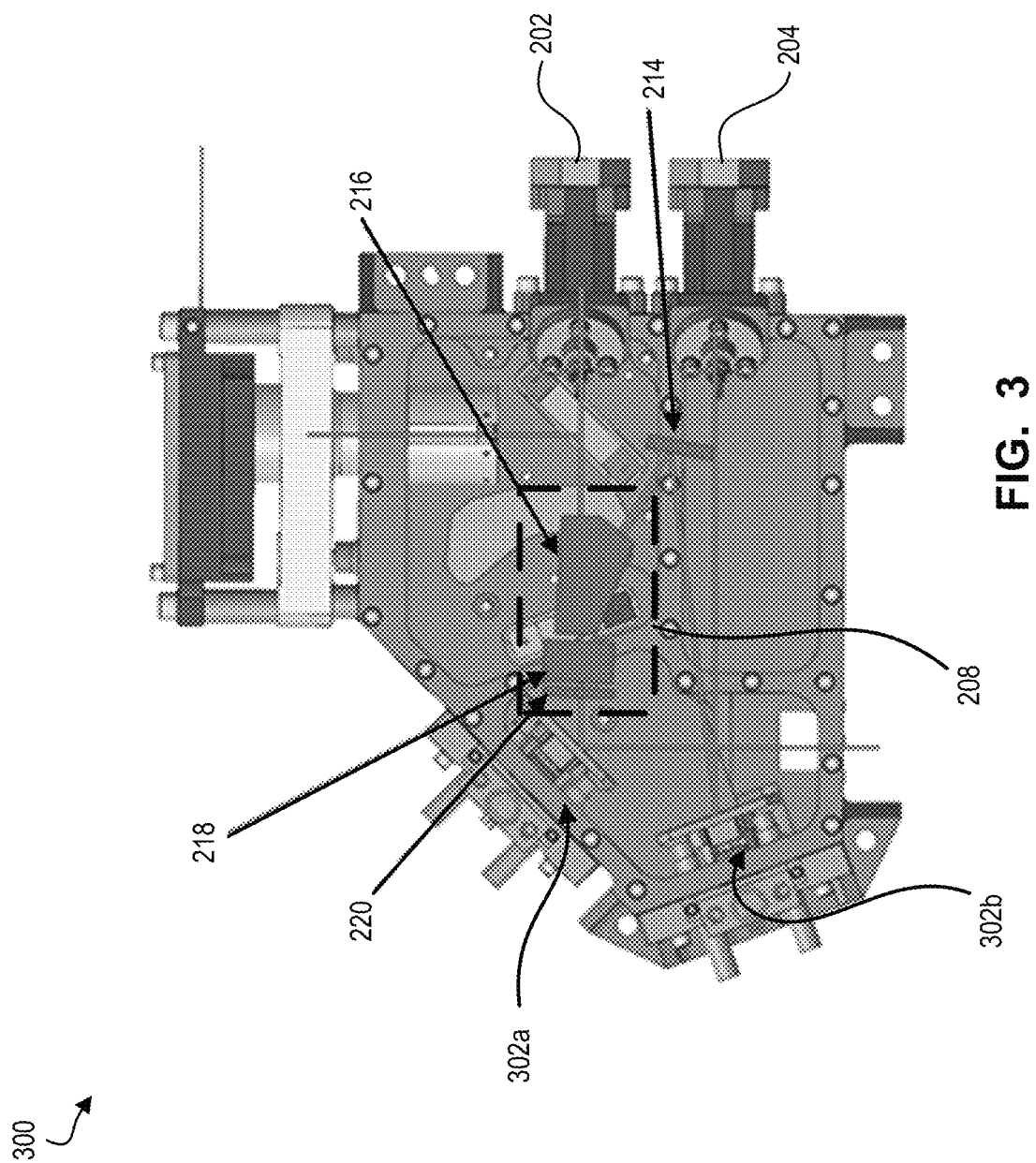
FIG. 3 is an illustration of the optical communication system of FIG. 2A installed inside of an optical communication terminal.

Referring now to FIG. 3, illustrating the optical communication system 200 installed inside of an optical communication terminal 300.

As shown, the communication terminal 300 may include a receiver 202 and a transmitter 204, as well as the MUX-DEMUX assembly 208 which includes the polarization division multiplexer 216, non-reciprocal polarization rotator 218, and the quarter wave plate 220. Additionally, an additional waveplate 214 may be positioned along the transmitting signal path 226. In some embodiments, waveplate 214 can be affixed to a mirror to fold the optical beam for compactness. In some cases, one or more mirrors 302a, 302b may be positioned inside the terminal 300 for deflecting the optical signal between various optical components.

Figure 4:
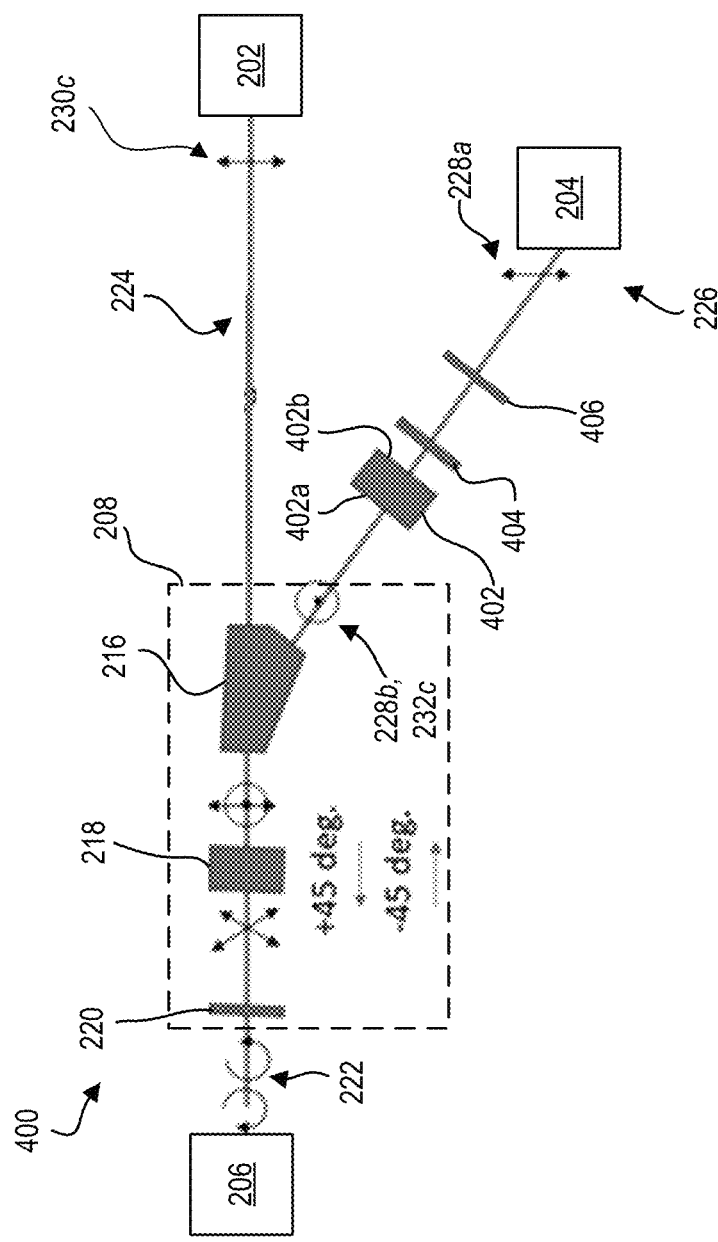
FIG. 4 is an example optical communication system, in accordance with another embodiment.

Referring now to FIG. 4, which shows an optical communication system 400, according to another embodiment.

As shown, the optical communication system 400 is generally analogous to the communication system 200, with the exception that the half-wave plate 214—along the optical transmission path 226—has been replaced by a non-reciprocal polarization rotator 402, a reciprocal polarization rotator 404 and a linear polarizer 406 aligned to the TE polarization. The non-reciprocal rotator 402 may be a Faraday rotator, configured to rotate an incident signal by ±45° depending on the direction of signal propagation. In particular, in the illustrated example embodiment, the Faraday rotator includes a first face 402a directed toward the polarization division multiplexer 216, and a second face 402b directed toward the transmitter 204. The Faraday rotator can apply a −45° rotation to signals propagating from the first face 402a toward the second face 402b, while applying a +45° rotation to signals propagating from the second face 402b toward the first face 402a. The reciprocal rotator 404 may be configured to rotate an incident optical signal by a +45° angle. The effect of the combination of the non-reciprocal rotator 402, reciprocal rotator 404 and linear polarizer 406 is to pass through unaffected the transmitted signal 228a—encoded on TE polarization—to the external optical assembly 206, while extinguishing backscattered signal 232c as it propagates from the polarization division multiplexer 216 towards transmitter 204.

In particular, in the case of the transmitted signal 228a—the transmitted signal 228a is TE polarized, and accordingly passes unaffected through the TE aligned linear polarizer 406. The transmitted signal 228a is then rotated by +45° by the reciprocal polarization rotator 404, and a further +45° by the non-reciprocal polarization rotator 402, to transform the transmitted signal 228a into a TM mode signal 228b. The TM mode signal 228b continues onwards to the external assembly 206 as previously described with reference to FIG. 2B. In contrast, in the case of backscattering—the TM mode backscattered signal 232c passes through the non-reciprocal polarization rotator 402 which effects a −45° rotation. The signal then further passes through the reciprocal polarization rotator 404 which effect a +45° rotation, thereby reversing the effect of the non-polarization rotator 402. This, in turn, returns the backscattered signal into a TM mode polarization. As the TM mode signal is now orthogonal to the linear polarizer 406—the linear polarizer 406 substantially extinguishes the backscattered signal 232c. Accordingly, the combination of the non-reciprocal polarization rotator 402, the reciprocal polarization rotator 404 and the linear polarizer 406 is to provide an optical isolation function, and additional protection of transmitter 204 from backscattering of a transmitted signal.

Figure 5A:
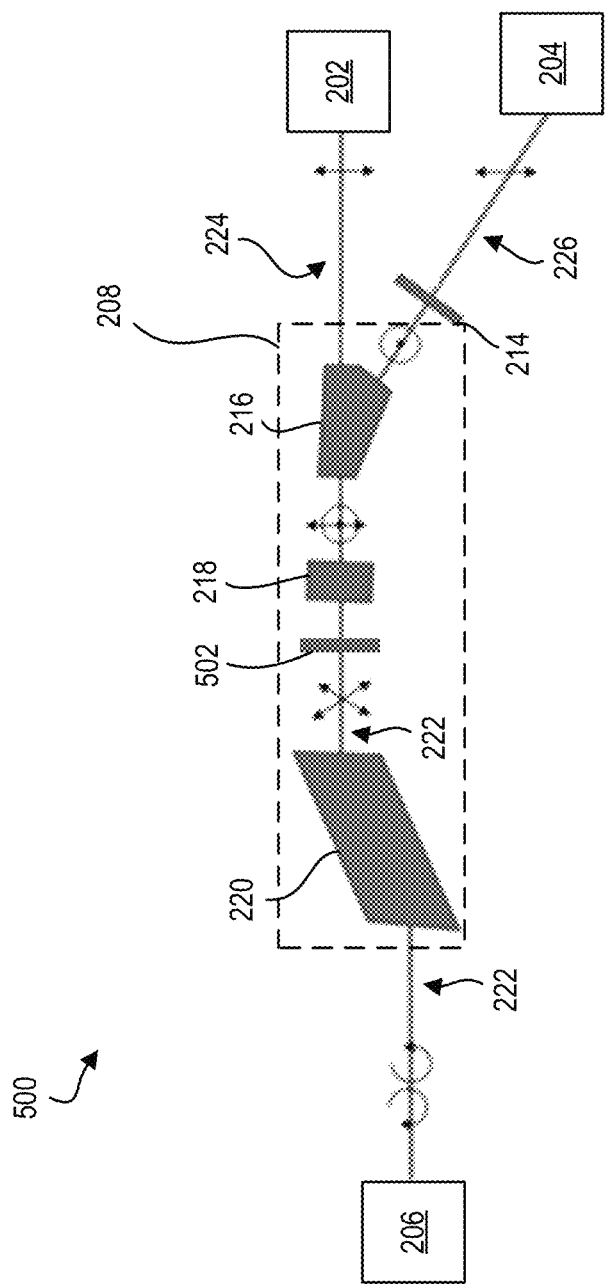
FIG. 5A is an example optical communication system, in accordance with still another embodiment.

Referring now to FIG. 5A, which shows an example optical communication system 500, according to still another embodiment.

In particular, it has been appreciated that optical components may have varying performance dependencies based on the wavelength of the transmitted optical signal, as well as the operating temperature of the optical components. In various cases, the wavelength dependencies may compromise—or limit—the isolation efficacy of the optical communication system when, for example, a large number of dense wavelength division multiplexing (DWDM) channels are transmitted. Similarly, the temperature dependency can compromise the efficacy for a range of operating temperatures.

In view of the foregoing, FIG. 5A shows optical system 500 which is generally analogous to the optical system 200 of FIG. 2, with the exception that a linear polarizer 502 has been interposed along the external signal path 222, between the non-reciprocal polarizer 218 and the quarter wave plate 220. Further, a quarter wave plate 220, having low temperature and low wavelength dependency, is provided (e.g., a Fresnel Rhomb).

Referring now to FIG. 5B, which illustrates the operation of the optical communication system 500 when an optical signal is transmitted from the transmitter 204.

As shown, similar to communication system 200, the non-reciprocal rotator 218 (e.g., the Faraday rotator) rotates the transmitted TM mode signal 228b into a linearly-polarized signal 228$c_1$ which is rotated by a +45° angle. However, in the exemplified system 500, the polarized signal 228$c_1$ passes through the linear polarizer 502, prior to passing through the polarization rotator 220. In the illustrated embodiment, the linear polarizer 502 passes optical signals rotated by a +45° angle. Accordingly, the incident optical signal 228$c_1$ passes unaffected through the linear polarizer 502 as signal 228$c_2$. The signal 228$c_2$ is then transformed into a circularly polarized signal 228d (e.g., left-hand circularly polarized signal) by quarter wave plate 220.

Referring now to FIG. 5C, which illustrates the operation of the optical communication system 500 when an optical signal is received.

As shown, a circularly polarized signal 230a may be received from the external assembly 206. The circularly polarized signal 230a is polarized in the same direction as the transmitted signal (e.g., left-hand circularly polarized). The circularly polarized signal 230a passes through quarter wave plate 220, which transforms the signal into a linearly polarized signal 230$b_1$, also rotated by a +45° angle. Accordingly, the rotated linearly polarized signal 230$b_1$ also passes unaffected through the linear polarizer 502 and is transmitted as linearly polarized signal 230$b_2$. The signal 230$b_2$ is then transmitted forward to the reception terminal 202 as previously explained with reference to FIG. 2B.

Figure 5D:
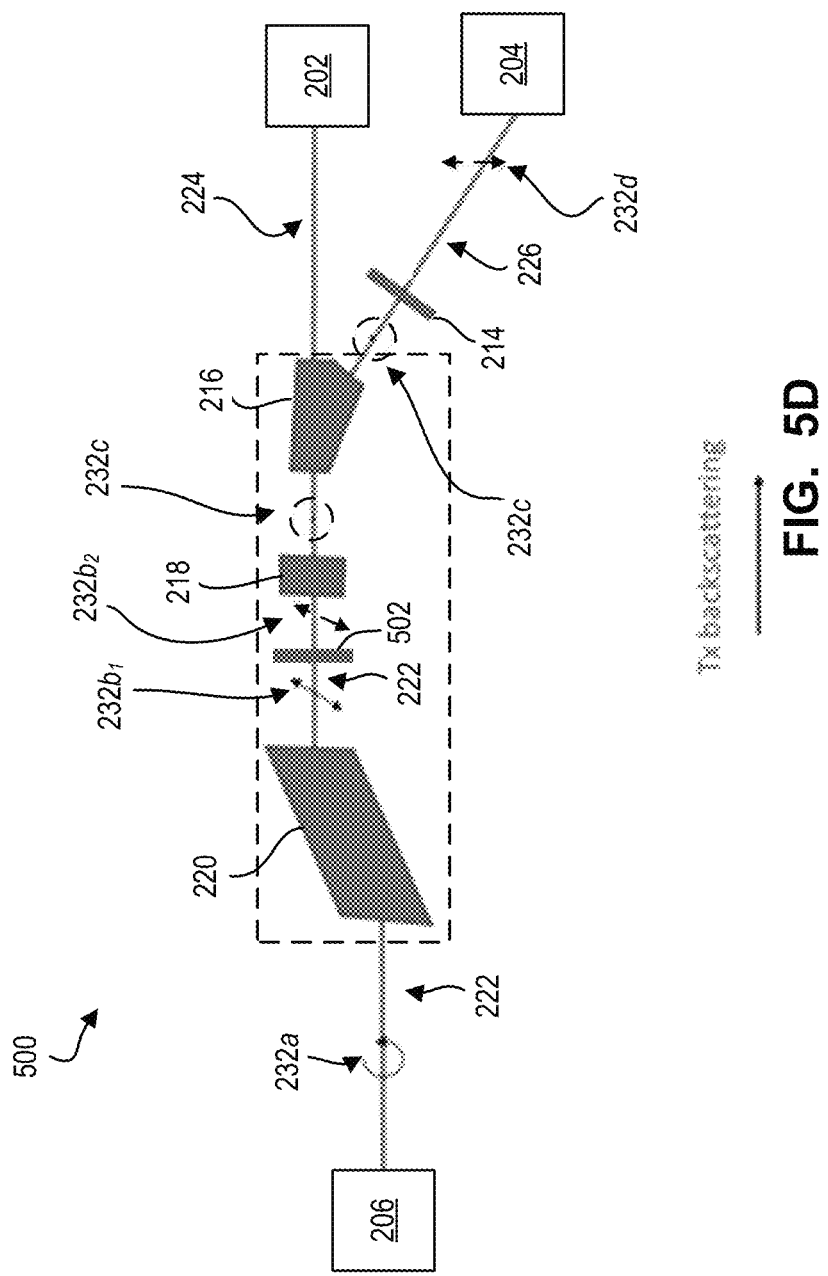
FIG. 5D is the example optical communication system of FIG. 5A, and showing backscattering of a transmitted optical signal.

While the linear polarizer 502 has no significant effect during the normal course of operation of the communication system 500 (i.e., during transmitting or receiving signals), the advantage of the linear polarizer 502 will now be better appreciated with reference to FIG. 5D.

Referring now to FIG. 5D, which illustrates the operation of the optical communication system 500 when at least a portion of a transmitted optical signal experiences backscattering or retro-reflection.

As shown, the backscattered signal 232a is received having a reversed optical circular polarization (e.g., right-hand circularly polarized). The circularly polarized signal 232a passes through quarter wave plate 220 to transform into a linearly polarized signal 232$b_1$ rotated by a −45° angle. As the linearly polarized signal 232$b_1$ has a linear polarization orthogonal to the linear polarizer 502, the signal 232$b_2$ passing through the linear polarizer 502 is heavily attenuated, as most of the signal is filtered by the orthogonally directed linear polarizer 502. The attenuated signal 232b2 continues to the transmitter 204 as previously explained with reference to FIG. 2D.

Accordingly, the effect of the linear polarizer 502 is to attenuate the power of the backscattered signal to provide for further isolation between the backscattered signal and received signals. Another effect of the linear polarizer 502 is to clean-up—at the expense of a small insertion loss penalty—the polarization states of signals 228$c_2$ and 230$b_2$ in the presence of imperfect polarization rotation due to either wavelength or temperature dependence of quarter wave plate 220 and/or non-reciprocal polarization rotator 218. In particular, assuming −0.15 degrees of rotation per degree of temperature or nanometer wavelength, insertion of polarizer 502 would cause a negligible penalty of less than 0.01 dB (e.g., over 10 wavelength channels separated by 100 GHz at 1550 nm and over 10 degrees temperature range) and provide a minimum extra attenuation of backscattered beam 232b2 of at least 13 dB (nominal 30 dB).

It will be appreciated that while the linear polarizer 502 has been oriented to pass signals having a +45° rotation, in other cases, the linear polarizer 502 may be oriented to pass signals having a −45° rotation if the transmitted and received signals are right-hand circularly polarized, rather than left-hand circularly polarized.

Figure 5E:
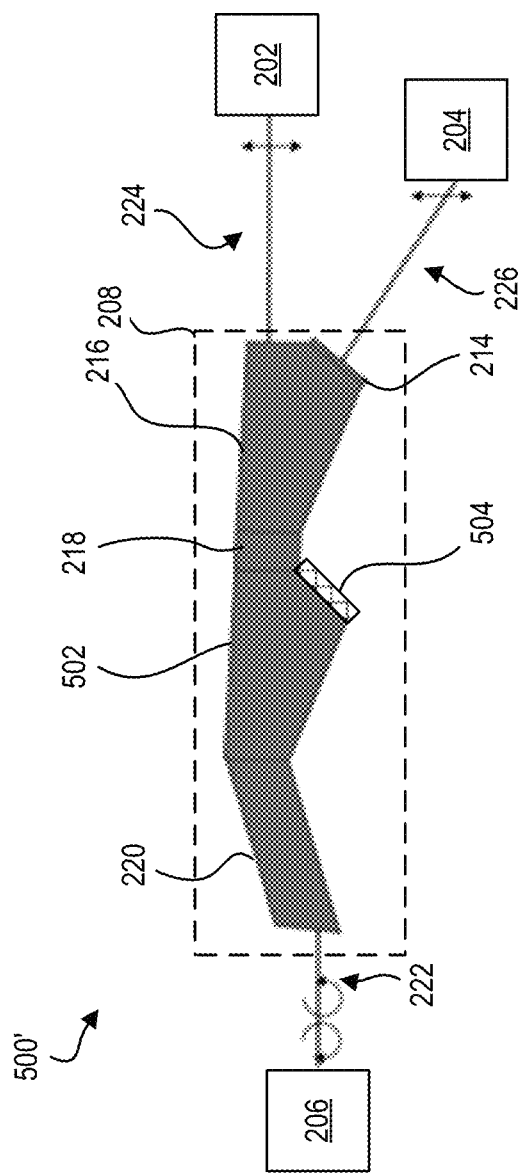
FIG. 5E is a compact embodiment of the example optical communication system of FIG. 5A.

Referring now to FIG. 5E, there is shown a compact optical communication assembly 500'. The assembly 500' represents a compact and/or miniaturized version of the optical assembly 500. In the compact assembly 500', the optical components are positioned with abutting complementary faces.

In the illustrated example embodiment, the linear polarizer 502 may be replaced with a Glan-Thompson prism 502. The prism 502 may act as a linear polarizer by directly passing linearly polarized signals rotated by a +45° angle. In contrast, linearly polarized backscattered transmitted signals rotated by a −45° angle may be deflected and rejected through the light dump 504.

Figure 6:
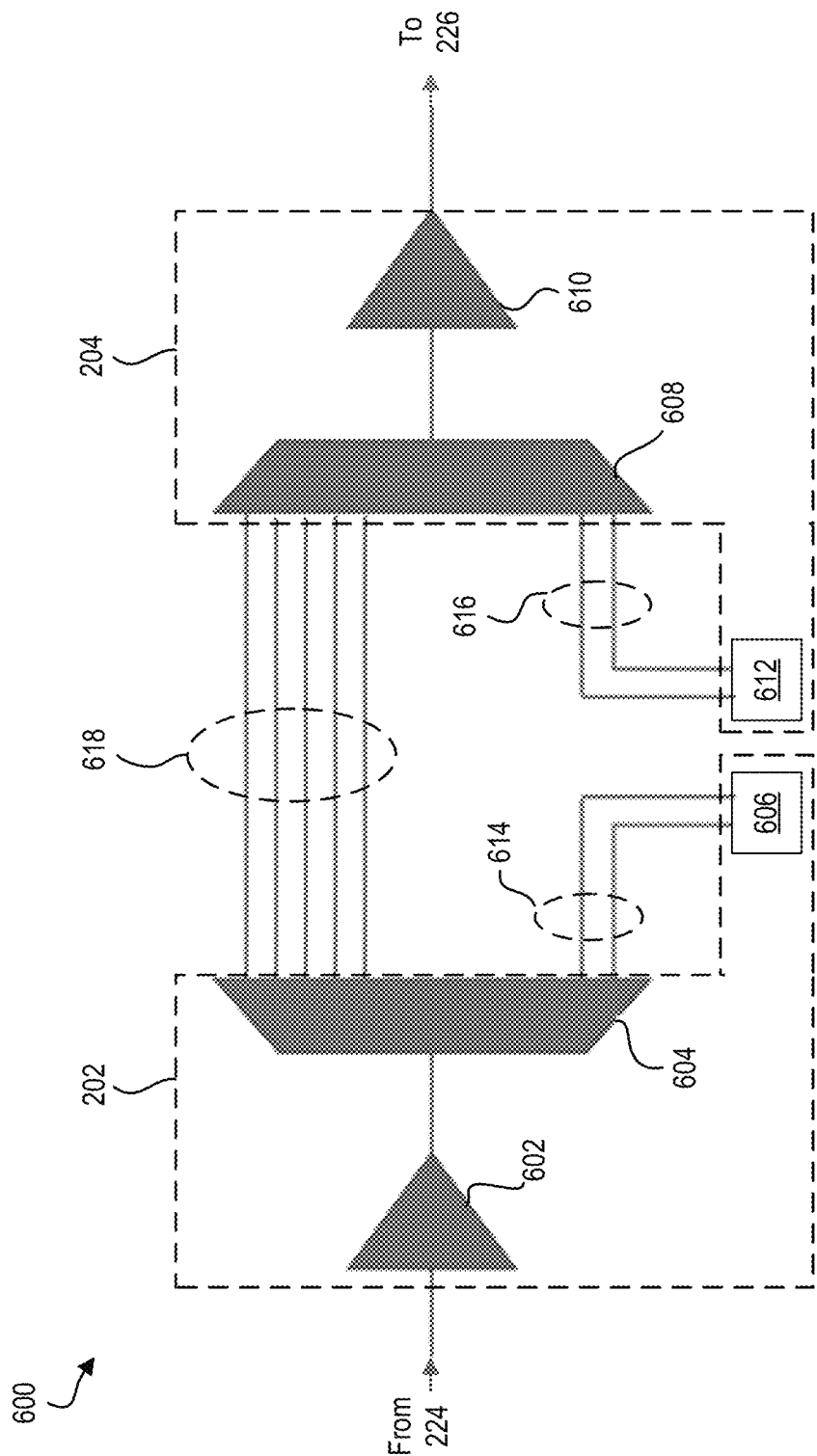
FIG. 6 is a partial diagram representation for an example optical communication system.

Referring now to FIG. 6, there is shown a partial diagram representation of an example optical communication system 600. Optical communication system 600 may correspond to any one of optical communication systems 200, 400 and 500 previously exemplified.

In particular, FIG. 6 shows the optical receiver 202 and the optical transmitter 204. Optical receiver 202 may include a low noise optical amplifier (LPOA) 602, an optical de-multiplexer 604, and a receiver subassembly 606. The LPOA amplifies weak signals received along the signal reception path 224. The optical de-multiplexer 604 can de-multiplex a received optical signal containing a plurality of multiplexed wavelength channels (e.g., using DWDM schemes). In some cases, the received optical signal may have 10 DWDM channels at 100 GHz spacing, or 20 DWDM channels at 50 GHz spacing. The receiver subassembly 606 can receive and decode one or more de-multiplexed optical signals received over one or more wavelength channel bands, and may include, for example, a coherent receiver.

Optical transmitter 204 may include an optical multiplexer 608, a high power optical amplifier (HPOA) 610 and transmitter subassembly 612. The optical multiplexer 608 can multiplex a plurality of wavelength channel bands for transmission (e.g., using a DWDM scheme). The HPOA 610 may amplify the combined multiplexed signal for transmission to another optical terminal. The transmitter subassembly 612 may include, for example, a transmitting laser and an optical modulator for encoding data into an optical signal.

As previously stated, the optical systems 200, 400 and 500 are generally wavelength independent, and accordingly, the optical systems may be backward and forward compatible to communicate with other optical terminals deployed earlier or later than the system 600, and which communicate at higher or lower wavelength band channels. Owing to this advantage, when optical systems 200, 400, or 500 are deployed, they may be configurable to perform at least two different functions. In a first function, the optical systems may receive and transmit optical signals over various wavelength bands. Accordingly, as shown in FIG. 6, system 600 may have one or more dedicated receiving channels 614, and one or more dedicated transmitting channels 616. The receiving channels 614 feed into the receiver subassembly 606, which converts the received signal into an electrical signal for decoding. The transmitting channels 616 are optical signals generated from optically encoded electrical data from the transmitter 612. The receiving and/or transmitting channels can be low wavelength band channels to communicate with older deployed terminals, or high wavelength band channels to communicate with newer deployed terminals.

In a second function, the optical system 600 may also act as a repeater, in which the optical system 600 simply transmit forward (e.g., pass-through) signals received from other optical terminals in the communication network, irrespective of the wavelength of the signal being passed through. For example, in FIG. 1, satellite 104b can pass-through signals from satellite 104a to satellite 104c. In some cases, this is done to boost the signal power (e.g., via the LPOA 602 and HPOA 610) as it travels through free space, or otherwise guide the propagation direction of the signal. Accordingly, as shown in FIG. 6, a plurality of wavelength band channels in the system 600 can be dedicated to simply passing-through—from the receiving path 224 to transmitting path 226—de-multiplexed optical signals 618 at various wavelength bands. These signals are passed through without otherwise converting the signal into electrical signals for the purposes of signal decoding. Owing to the wavelength independent nature of the system 600, wavelengths channels over a large band may be passed-through unaffected by the system. Accordingly, the system can be deployed to pass wavelength channels between older and newer deployed terminals, without consequence.

In various embodiments, wavelength de-multiplexer 604 and wavelength multiplexer 608 comprise of pass band optical filters, low pass and/or high pass optical filters or dichroic filter and only de-multiplex/multiplex wavelength channels 614, 616 that are processed by the optical system 600, while permitting wavelength channels 618 to pass through as wavelength bands without being de-multiplexed/multiplexed into individual wavelength channels. Processed wavelength channels 614, 616 can be low or high band channels, but other arrangements are possible.

In various cases, the optical assembly 600 may be representative of the optical system 500 of FIG. 5 which is configured to accept signals over a wide wavelength band range owing to the various elements of the system 500 which have low wavelength dependency (e.g., the Fresnel Rhomb 220).

Accordingly, the diagrammatic representation in FIG. 6 illustrates an advantage of the disclosed optical system which is able to isolate between transmitting and receiving channels, and avoid the effect of backscattering on the receiver, without relying on the wavelength of the received and/or transmitted signals.

In various cases, in at least some of the previous exemplified optical assemblies, optical elements may be also tilted or wedged by greater than 0.5° to minimize back-reflections.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. An optical system comprising:
   an optical transmitter coupled to an optical signal transmission path;
   an optical receiver coupled to an optical signal reception path; and
   an external signal path extending between an external optical assembly and both the optical signal transmission path and the optical signal reception path;

an optical polarization division multiplexer coupling the optical signal transmission path and the optical signal reception path to the external signal path, wherein the optical polarization division multiplexer is configured to couple optical signals having a first polarization between the external signal path and the optical signal transmission path and the optical polarization division multiplexer is configured to couple optical signals having a second polarization between the external signal path and the optical signal reception path, wherein the second polarization is orthogonal to the first polarization;

a first non-reciprocal polarization rotator positioned along the external signal path between the optical polarization division multiplexer and the external optical assembly; and a quarter wave plate positioned along the external signal path between the non-reciprocal polarization rotator and the external optical assembly, wherein the optical transmitter is configured to emit a transmitted light signal having the first polarization in an outward direction along the external signal path towards the external optical assembly via the optical signal transmission path and the optical polarization division multiplexer;

the optical receiver is configured to receive a received light signal having the second polarization having travelled from the external optical assembly along the external signal path in an inward direction towards the optical receiver via the optical signal transmission path and the optical polarization division multiplexer;

the outward direction is opposite to the inward direction; and the first non-reciprocal polarization rotator and the quarter wave plate are arranged to convert any optical signal travelling in the outward direction with the first polarization to a first circular polarization having a first handedness and to convert any optical signal travelling in the inward direction along the external signal path with a second circular polarization back to the first polarization, wherein the second circular polarization has a second handedness orthogonal to the first handedness.

2. The optical system of claim 1, wherein the first non-reciprocal polarization rotator is a Faraday rotator.

3. The optical system of claim 1, wherein the optical polarization division multiplexer comprises a polarizing prism.

4. The optical system of claim 3, wherein the polarizing prism is a Glan-Thompson prism.

5. The optical system of claim 1, further comprising a half-wave plate positioned along the optical signal transmission path between the optical transmitter and the optical polarization division multiplexer.

6. The optical system of claim 5, wherein the half-wave plate is configured to convert between the first polarization and the second polarization.

7. The optical system of claim 1, wherein the first polarization is a transverse magnetic (TM) polarization, and the second polarization is a transverse electric (TE) polarization.

8. The optical system of claim 1, further comprising an optical isolator positioned along the optical signal transmission path between the optical transmitter and the optical polarization division multiplexer, the optical isolator comprising a second non-reciprocal polarization rotator, a reciprocal polarization rotator and a linear polarizer.

9. The optical system of claim 8, wherein the second non-reciprocal polarization rotator is a Faraday rotator.

10. The optical system of claim 8, wherein the reciprocal polarization rotator effects a 45° rotation to a signal polarization.

11. The optical system of claim 8, wherein the linear polarizer has a transverse electric (TE) polarization alignment.

12. The optical system of claim 1, wherein the quarter-wave plate comprises a Fresnel Rhomb.

13. The optical system of claim 1, wherein a linear polarizer is positioned along the external signal path between the quarter wave plate and the first non-reciprocal polarization rotator.

14. The optical system of claim 13, wherein the linear polarizer adjusts a polarization state of an incident optical signal to compensate for imperfect polarization rotation resulting from at least one of wavelength and temperature dependence for at least one of the quarter wave plate and the first non-reciprocal polarization rotator.

15. The optical system of claim 13, wherein the linear polarizer has a +45° rotation alignment.

16. The optical system of claim 13, wherein the linear polarizer is a Glan-Thompson prism, and a prism face of the Glan-Thompson prism comprises a light dump.

17. The optical system of claim 1, wherein the optical system is used with dense wavelength division multiplexing (DWDM) schemes as to provide the optical system with forward and backward compatibility with other optical systems.

18. The optical system of claim 1, wherein the optical system comprises a compact assembly formed by arranging optical elements with abutting complementary faces.

19. The optical system of claim 1, wherein the first circular polarization is a left-hand circular polarization, and the second circular polarization is a right-hand circular polarization.

20. The optical system of claim 1, wherein the quarter wave plate is at least one of mounted to a rotary stage, and switched electrically using liquid crystal, to allow the system to switch between communicating with other optical terminals communicating using circular polarization signals having different handedness.

* * * * *